US006535366B1

(12) United States Patent
Fröhlich et al.

(10) Patent No.: US 6,535,366 B1
(45) Date of Patent: Mar. 18, 2003

(54) HIGH-SPEED CURRENT-LIMITING SWITCH

(75) Inventors: Klaus Fröhlich, Baden (CH); Walter Holaus, Zürich (CH); Kurt Kaltenegger, Lengnau (CH); Michael Steurer, Bülach (CH)

(73) Assignee: ABB Schweiz AG, Baden (CH)

( * ) Notice: Subject to any disclaimer, the term of this patent is extended or adjusted under 35 U.S.C. 154(b) by 181 days.

(21) Appl. No.: 09/708,070

(22) Filed: Nov. 8, 2000

(30) Foreign Application Priority Data

Nov. 8, 1999 (DE) ........................................ 199 53 551

(51) Int. Cl.[7] ................................................ H02H 3/00

(52) U.S. Cl. ................................ 361/8; 361/8; 361/13; 361/10; 361/115

(58) Field of Search ................................ 361/8, 13, 10, 361/9, 93.9, 91.1, 115

(56) References Cited

U.S. PATENT DOCUMENTS

| | | | | | |
|---|---|---|---|---|---|
| 5,650,901 | A | * | 7/1997 | Yamamoto | 361/8 |
| 5,867,356 | A | * | 2/1999 | Duggal et al. | 361/13 |
| 6,051,893 | A | * | 4/2000 | Yamamoto et al. | 307/43 |
| 6,465,911 | B1 | * | 10/2002 | Takeda et al. | 307/70 |

FOREIGN PATENT DOCUMENTS

| | | |
|---|---|---|
| EP | 1 022 755 | 7/2000 |

* cited by examiner

*Primary Examiner*—Stephen W. Jackson
*Assistant Examiner*—Danny Nguyen
(74) *Attorney, Agent, or Firm*—Burns, Doane, Swecker & Mathis, L.L.P.

(57) ABSTRACT

The current-limiting switch (S) has an arc-resistant contact arrangement ($K_1$), which is intended to carry the rated current ($I_N$), of a first switching point ($S_1$), and two commutation paths ($P_1$ and $P_2$) connected in parallel with the first switching point ($S_1$). The first commutation path ($P_1$) contains, in series, a contact arrangement ($K_T$) of a second switching point ($S_T$) and an electronic power switching apparatus (T). The second commutation path ($P_2$) contains, in series, a switching apparatus ($S_A$) and a current-limiting element ($R_B$). The contact arrangements ($K_1$ and $K_T$) are designed to be coaxially symmetrical and are arranged in a pressure-resistant housing (G). Both switching points have electrodynamic drives which open and close very quickly.

Figure 1:
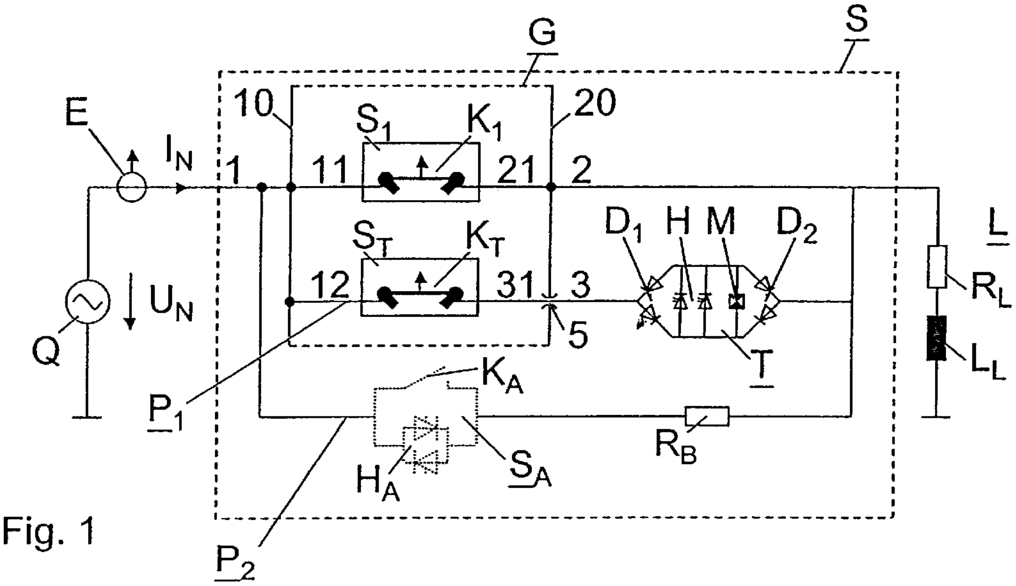

Thanks to the extremely space-saving, coaxial arrangement of the contact arrangements, undesirable stray inductances can be avoided. This allows the current-limiting switch to be switched on and off very quickly.

12 Claims, 2 Drawing Sheets

HIGH-SPEED CURRENT-LIMITING SWITCH

The invention is based on a current-limiting switch as claimed in the precharacterizing clause of patent claim 1.

Such current-limiting switches may be used in the high-voltage or medium-voltage areas as generator switches, as coupling switches between busbar sections in switchgear assemblies, as DC switches, or in mesh-connected networks to reduce the operational losses.

The invention refers to a prior art of current-limiting switches as is described, for example, in European Application EP Application No. 98811251.2, which has not yet been published. This switch has a high-speed mechanical switching point with galvanic contacts, and two commutation paths connected in parallel with them. A first switching apparatus and an isolating switching point are arranged in series in the first commutation path, and a current limiter and a second switching apparatus are connected in series in the second commutation path. The current limiter is designed in such a way that current which is carried by it and is commutated from the first to the second commutation path when the first switching apparatus opens is limited with a time delay. During this time delay, no overvoltage can build up across the two commutation paths, and an overvoltage-resistant isolation path can at the same time be formed in the first commutation path.

The invention, as it is specified in the patent claims, is based on the object of providing a current-limiting switch of the type mentioned initially which, thanks to its special, space-saving design and the small moving mass, allows high-speed on and off switching in the high-voltage and medium-voltage areas.

The current-limiting switching according to the invention has three paths arranged in parallel with one another, two of which contain a mechanical switching point. One of these mechanical switching points is designed to carry and switch rated current, while the other carries a commuted current, briefly and in the form of a pulse, just while switching is taking place. The contact arrangements of the mechanical switching points are designed to be axially symmetrical and are arranged coaxially. Short, coaxial copper connections result in very low stray inductances, thus allowing a current to be commutated very quickly.

If the third path of the switch according to the invention also contains a mechanical switching point with a coaxially arranged contact arrangement, there is no need for any series disconnector to be connected in series with conventional current-limiting switches.

If the contact arrangements have different diameters and they are arranged located one inside the other, the extent of the switch in the axial direction is reduced. This makes it possible to reduce the dimensions of a housing in which the contact arrangements are arranged, in order to be protected, for example, against dust and other disturbing influences. In this case, it is particularly advantageous for a contact arrangement to be arranged in a pressure-resistant housing which, for example, is filled with an insulating gas at atmospheric pressure, or at a higher pressure, and this has an advantageous effect on the dielectric properties of the contact arrangement. If the housing contains two electrically conductive parts which are insulated from one another, the rated current can be carried directly via these housing parts to the connections of the rated-current switching point. There is thus no need for any complex rated-current bushings through the housing.

If the switching points contain a high-speed drive for opening and closing the contact arrangement, it is possible to implement different algorithms, corresponding to the operational requirements, for opening and/or closing the switch.

Figure 2:
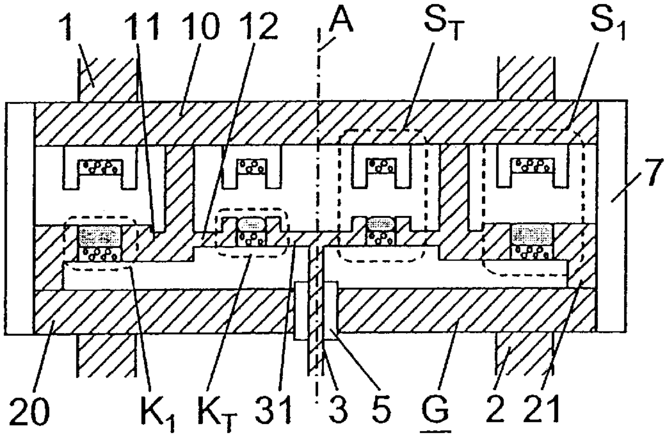
Figure 3:
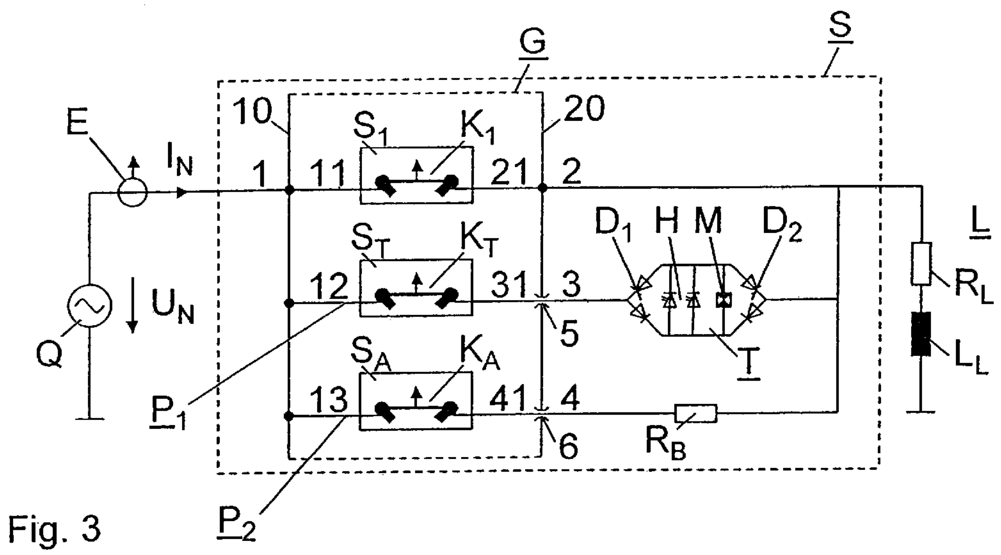
Figure 4:
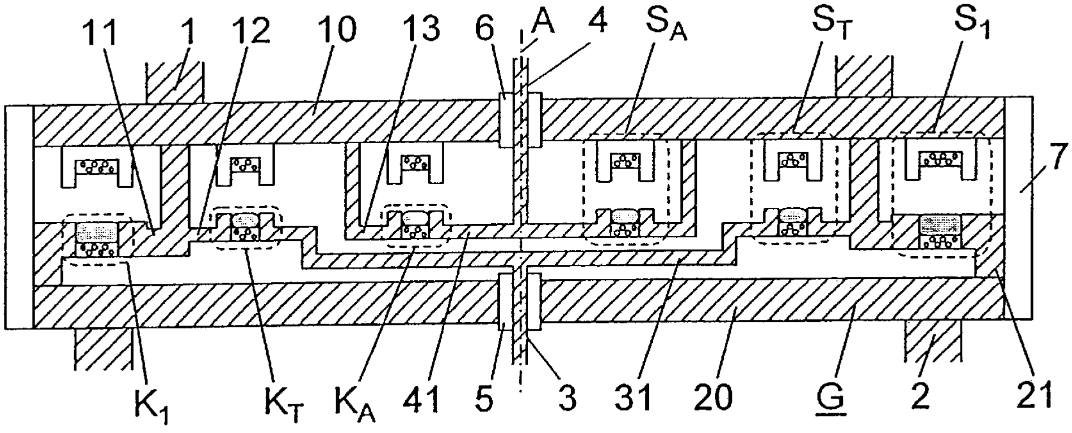
Figure 5:
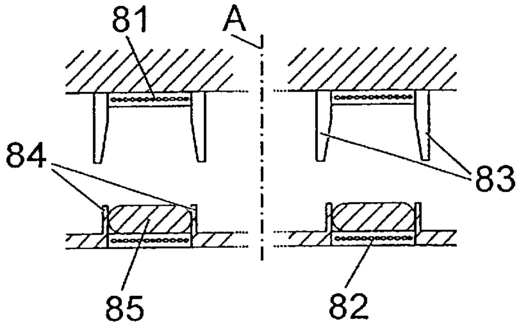

An embodiment of the invention and the further advantages which can be achieved by means of it are explained in more detail in the following text with reference to drawings, in which:

FIG. 1 shows a single-phase basic circuit of a test apparatus, which simulates a medium-voltage network, having a first embodiment of a current-limiting switch according to the invention, FIG. 2 shows a plan view of a section, passing along one axis, through a housing having switching points of the switch shown in FIG. 1, FIG. 3 shows a single-phase basic circuit of a test apparatus, which simulates a medium-voltage network, having a second embodiment of a current-limiting switch according to the invention, and FIG. 4 shows a plan view of a section, passing along one axis, through a housing having switching points of the switch shown in FIG. 3, and FIG. 5 shows a plan view of a detail, illustrated enlarged, of a switching point of the switch shown in FIG. 4.

In all the figures, the same reference symbols relate to parts having the same effect.

The circuit illustrated in FIG. 1 is a single-phase basic circuit of a test apparatus which simulates a medium-voltage network, having a first embodiment of a current-limiting switch S according to the invention. The test apparatus contains a generator Q, which simulates a mains voltage $U_N$ of several 10 kV, the switch S and a load L which simulates a non-reactive resistor $R_L$ and an inductance $L_L$. A short-circuit current identification unit E is connected between the generator Q and the switch S and contains a measurement and evaluation section for very fast identification of short-circuit currents of up to several 10 kA. The switch S has a rated-current switching point $S_1$ connected in the current path from the generator Q to the load L. Two commutation paths $P_1$ and $P_2$ are connected in parallel with the rated-current switching point $S_1$.

The first commutation path $P_1$ contains an isolating switching point $S_T$ and an electronic power switching apparatus T with a diode bridge $D_1$, $D_2$, power semiconductors H which can be turned off, for example GTOS, and a surge arrester M. The diode bridge allows alternating currents to be switched both during positive polarity and during negative polarity, without any back-to-back-connected power semiconductors.

The second commutation path $P_2$ contains, connected in series, a disconnection switching point SA and a current limiter $R_B$ which responds to a current with a time delay and is designed, for example, in the form of a PTC thermistor. The disconnection switching point may be in the form of a semiconductor switch $H_A$ having back-to-back-connected power semiconductors which can be turned off, for example GTOs, or may comprise a galvanically isolating, mechanical contact arrangement $K_A$, preferably a vacuum switch.

The switching points $S_1$ and $S_T$ of the switch shown in FIG. 1 each have a contact arrangement $K_1$, and $K_T$, which open very quickly, within a few 100 $\mu$s. The contact arrangement $K_1$ of the rated-current switching point $S_1$ is designed to be arc-resistant.

In one advantageous embodiment of the switch according to the invention, the two contact arrangements $K_1$ and $K_T$ of the switching points $S_1$ and $S_T$ are arranged in a housing G. On the generator side, the two contact arrangements $K_1$ and $K_T$ of the switching points $S_1$ and $S_T$ are connected via a connection 1, a first housing part 10 and primary feeders 11 and 12. On the load side, the rated-current switching point $S_1$ is connected to the connection 2 via a secondary feeder 21 and a second housing part 20. The isolating switching point $S_T$ of the first commutation path $P_1$ is connected to the electronic power switching apparatus T via a secondary feeder 31, which is routed through the housing G by means of a bushing 5.

During operation, the contact arrangements $K_1$, and $K_T$ of the two switching points $S_1$ and $S_T$ together with the disconnection switching point $S_A$ are respectively closed and switched on. When a short-circuit current occurs, the identification unit E on the current-limiting switch S initiates a disconnection process within about 100 $\mu$s. In the process, the semiconductor elements H located in the first commutation path $P_1$ are switched on immediately. At the same time, the contact arrangement $K_1$, of the rated-current switching point $S_1$ is opened. Owing to two series-connected arcs which are formed during this process, the short-circuit current, which is still rising, commutates within about 150 $\mu$s into the first commutation path $P_1$. The semiconductor elements H remain switched on until a withstand voltage is reached across the contact arrangement $K_1$, of the rated-current switching point $S_1$ which is greater than the withstand voltage across the semiconductor elements H. The short-circuit current in the first commutation path $P_1$ is then switched off by means of the semiconductor elements H, and commutates into the second commutation path $P_2$. The contact arrangement $K_T$ of the isolating switching point $S_T$ is opened at the same time. During the second commutation process, a transient overvoltage occurs due to stray inductances, and a resistive voltage drop occurs across the current limiter $R_B$. The current limiter $R_B$ limits with a delay of several 100 $\mu$s. This time delay is sufficient in order to complete the opening process on the contact arrangement $K_1$ of the rated-current switching point $S_1$ and on the contact arrangement $K_T$ of the isolating switching point $S_T$. Once the contact arrangement $K_T$ of the isolating switching point $S_T$ has opened, virtually the entire voltage which is present across the switch S is dropped across the isolating switching point $S_T$ in the first commutation path $P_1$. Since the current limiter $R_B$ responds with a delay, the rise in the voltage across the switch S, and thus across the rated-current switching point $S_1$ and the isolating switching point ST does not start until after the contact arrangement $K_1$, of the rated-current switching point $S_1$ and the contact arrangement $K_T$ of the isolating switching point $S_T$ have opened. The limited short-circuit current can be switched off at the next current zero crossing, for example after 5 to 6 ms, by means of the disconnection switching point $S_A$, with a very low transient recovery voltage.

FIG. 2 shows one possible arrangement of the first embodiment of the switch according to the invention. The majority of the two switching points $S_1$ and $S_T$ is arranged, coaxially symmetrically, in a cylindrical housing G. The housing G is composed of two electrically conductive housing parts 10 and 20 in the form of panels, an electrically insulating housing part 7 designed in the form of a tube, and two electrically insulating, gas-tight bushings 5 and 6. The housing G is designed to be pressure-resistant and is filled with a gaseous medium, for example air or $SF_6$ at atmospheric pressure or a higher pressure.

The two switching points $S_1$ and $S_T$ are respectively composed of a contact arrangement $K_1$, and $K_T$, each having two stationary switching contacts and each having one moving bridge switching contact, and each having a drive, which can be initiated independently, for opening and/or closing the contact arrangement.

The two contact arrangements $K_1$ and $K_T$ are arranged located one inside the other, with the contact arrangement $K_1$ of the rated-current switching point $S_1$ having the largest diameter and being arranged on the outside, since it has an appropriate cross section for carrying the rated current. The contact arrangement $K_T$ of the isolating switching point $S_T$, through which a current which is being commutated flows briefly and in the form of a pulse only while switching is taking place, has a correspondingly smaller diameter and is arranged coaxially inside the contact arrangement $K_1$ of the rated-current switching point $S_1$. The feeders to the contact points are designed to be as short and axially symmetrical as possible, as shown in FIG. 2. The rated-current connections 1 and 2 are connected in the cylindrical housing G to the outer edge of the electrically conductive housing parts 1 and 2, which are in the form of panels, and may, for example, be designed in the form of a tube. The other feeders to the contact arrangements, as well as all the cables for the controls for the switching points, are advantageously routed out of the housing through the center of the housing parts 1 and 2, which are in the form of panels. Thanks to the inclusion of the housing parts 1 and 2 in the rated-current path, there is no need for any further bushings, in particular high-current and high-voltage bushings for the rated current.

FIG. 3 shows the circuit illustrated in FIG. 1, having an advantageous, second embodiment of the switch S according to the invention. In this case, the disconnection switching point $S_A$ comprises a mechanical contact arrangement $K_A$, which likewise opens very quickly. Together with the two contact arrangements $K_1$ and $K_T$ of the switching points $S_1$ and $S_T$, the contact arrangement $K_A$ of the disconnection switching point $S_A$ is arranged in the housing G. On the generator side, the disconnection switching point $S_A$ is likewise connected via the connection 1 and the first housing part 10, as well as a primary feeder 13. On the load side, the disconnection switching point $S_A$ is connected to the current limiter $R_B$ via a secondary feeder 41, which is routed through the housing G by means of a bushing 6, and via a connection 4.

The arrangement of the second embodiment of the switch according to the invention as shown in FIG. 4 corresponds largely to the arrangement shown in FIG. 2. In addition to the two switching points $S_1$ and $S_T$, the disconnection switching point $S_A$ is arranged coaxially symmetrically in the housing G.

With this embodiment, with galvanical isolation in each of the three parallel current paths, it is possible to dispense with the use of an additional series disconnector.

In addition to a moving bridge switching contact, which is part of the contact arrangement of the switching point, one advantageous embodiment of the drive for a switching point essentially provides two coils and an electronic power control unit. The contact arrangement and coils are designed to be axially symmetrical and are arranged coaxially with respect to one another. The detailed design of the three switching points will be explained in more detail with reference to a detail, illustrated in FIG. 5, of the arrangement shown in FIG. 2. In this case, the two coils 81 and 82 which are part of the drive of a switching point are each arranged offset in the axial direction on both sides of the associated bridge switching contact, which is designed as a contact ring 85. The contact ring has electrodynamic force applied to it by energy being fed from the electronic power control unit into the appropriate coil. The contact ring can be moved backward and forward in the axial direction between the two coils 81 and 82, with the contact arrangement opening and closing again in the process. When the contact arrangement is closed, the contact ring 85 fits in between the two stationary switching contacts 84, and short-circuits them. When the contact arrangement is open, the contact ring 85 is held firmly by a holding part 83.

| LIST OF DESIGNATIONS | |
|---|---|
| 1, 2 | Rated-current connection on the housing |
| 3, 4 | Secondary connection for the isolating switching point, disconnection switching point |
| 5, 6 | Bushing for the secondary connections |
| 7 | Electrically insulating housing part |
| 10, 20 | Electrically conductive housing part |
| 11, 12, 13 | Primary feeder to the switching point |
| 21, 31, 41 | Secondary feeder to the switching point |
| 81, 82 | Drive coils |
| 83 | Holding part |
| 84 | Stationary switching contacts |
| 85 | Contact ring |
| A | Axis of symmetry |
| $D_1$, $D_2$ | Diode bridge |
| E | Short-circuit identification unit |
| G | Housing |
| H | Semiconductor |
| $H_A$ | Semiconductor switch |
| $I_N$ | Rated current |
| $K_1$, $K_T$, $K_A$ | Contact arrangements |
| L | Load |
| $L_L$ | Load inductance |
| M | Surge arrester |
| Q | Voltage source, generator |
| $R_B$ | Current limiter |
| $R_L$ | Non-reactive load resistor |
| S | Current-limiting switch |
| $S_1$, $S_T$, $S_A$ | Rate-current, isolation, disconnection switching point |
| T | Electronic power switching apparatus |
| $U_N$ | Mains voltage |

What is claimed is:

1. A current-limiting switch (S) having a rated-current switching point ($S_1$) containing an arc-resistant contact arrangement ($K_1$), and having two commutation paths ($P_1$, $P_2$) which are connected in parallel with the rated-current switching point ($S_1$) and of which a first ($P_1$) contains, connected in series, a contact arrangement ($K_T$) of an isolating switching point ($S_T$) and an electronic power switching apparatus (T), and a second contains, connected in series, a disconnection switching point ($S_A$) and a current-limiting element ($R_B$), characterized in that the contact arrangement ($K_1$) of the rated-current switching point ($S_1$) and the contact arrangement ($K_T$) of the isolating switching point ($S_T$) are designed and arranged symmetrically with respect to a common axis (A).

2. The switch as claimed in claim 1, characterized in that the disconnection switching point ($S_A$) has a galvanically isolating contact arrangement ($K_A$) and in that this contact arrangement ($K_A$) is designed and arranged symmetrically with respect to the common axis (A).

3. The switch as claimed in claim 1, characterized in that the contact arrangements ($K_1$, $K_T$, $K_A$) of the switching points ($S_1$, $S_T$, $S_A$) have a diameter of different size and are arranged located one inside the other.

4. The switch as claimed in claim 1, characterized in that the contact arrangements ($K_1$, $K_T$, $K_A$) of the switching points ($S_1$, $S_T$, $S_A$) are arranged in a housing (G).

5. The switch as claimed in claim 4, characterized in that the housing is designed in the form of a cylinder, and in that the contact arrangements ($K_1$, $K_T$, $K_A$) of the switching points ($S_1$, $S_T$, $S_A$) and the housing (G) are arranged coaxially with respect to a common axis (A).

6. The switch as claimed in claim 4, characterized in that the housing (G) is designed to be pressure-resistant.

7. The switch as claimed in claim 4, characterized in that the housing has at least two electrically conductive housing parts (10, 20) which are connected to one another via at least one third, electrically insulating housing part (7).

8. The switch as claimed in claim 7, characterized in that the two electrically conductive housing parts (10, 20) are designed in the form of panels, and in that the electrically insulating housing part (7) is designed in the form of a tube and is arranged between the housing parts (10, 20), which are in the form of panels, in such a way that the two housing parts (10, 20), which are in the form of panels, bound the housing part (7), which is in the form of a tube, at the ends.

9. The switch as claimed in claim 7, characterized in that a common primary feeder (1, 11, 12, 13) is routed to the contact arrangements ($K_1$, $K_T$, $K_A$) of the switching points ($S_1$, $S_T$, $S_A$) via a first of the two electrically conductive housing parts (10), in that a secondary feeder (2, 21) is routed to the contact arrangement ($K_1$) of the rated-current switching point ($S_1$) via the second of the two electrically conductive housing parts (20), and in that the secondary feeders (3, 31, 4, 41) are routed to the contact arrangements ($K_T$, $K_A$) of the other switching points ($S_T$, $S_A$) through the housing.

10. The switch as claimed in claim 1, characterized in that each of the switching points ($S_1$, $S_T$and $S_A$) contains a drive for opening and/or closing the contact arrangements ($K_1$, $K_T$, $K_A$).

11. The switch as claimed in claim 10, characterized in that the drive produces electrodynamic force.

12. The switch as claimed in claim 11, characterized in that the drive comprises two coils (81, 82) which are arranged coaxially offset, a contact ring (85) which is arranged coaxially between the coils and moves in an axial direction, and an electronic power control unit, with the contact ring (85) short-circuiting two coaxially arranged, stationary contact pieces (84) when the switching point is closed.

* * * * *